(12) United States Patent
Kennedy et al.

(10) Patent No.: US 7,825,325 B2
(45) Date of Patent: Nov. 2, 2010

(54) PORTABLE LIGHTING AND POWER-GENERATING SYSTEM

(75) Inventors: Sheila Kennedy, Boston, MA (US); Sloan Kulper, Boston, MA (US); Casey Smith, Bozeman, MT (US); Tonya Ohnstad, Jamaica Plain, MA (US); Heather Micka-Smith, Lynn, MA (US); Frano Violich, Boston, MA (US)

(73) Assignee: Kennedy & Violich Architecture Ltd., Boston, MA (US)

( * ) Notice: Subject to any disclaimer, the term of this patent is extended or adjusted under 35 U.S.C. 154(b) by 378 days.

(21) Appl. No.: 11/904,602

(22) Filed: Sep. 27, 2007

(65) Prior Publication Data

US 2008/0079368 A1     Apr. 3, 2008

Related U.S. Application Data

(60) Provisional application No. 60/847,484, filed on Sep. 27, 2006.

(51) Int. Cl.
*H01L 31/042* (2006.01)
(52) U.S. Cl. .................. 136/244; 136/252; 362/249.04
(58) Field of Classification Search ................ 362/192, 362/227, 249.01, 249.02, 249.03, 249.04, 362/551, 555; 136/243, 244, 252, 263, 293
See application file for complete search history.

(56) References Cited

U.S. PATENT DOCUMENTS

| | | | | |
|---|---|---|---|---|
| 3,253,173 A | * | 5/1966 | Levetan | ........................ 428/426 |
| 5,603,648 A | * | 2/1997 | Kea | ............................ 441/106 |
| 5,957,564 A | * | 9/1999 | Bruce et al. | ................... 362/84 |
| 6,046,401 A | * | 4/2000 | McCabe | ...................... 136/244 |
| 6,180,868 B1 | * | 1/2001 | Yoshino et al. | ............. 136/244 |
| 6,639,355 B1 | * | 10/2003 | Pennaz et al. | ................ 313/498 |
| 6,886,864 B2 | * | 5/2005 | Nelson et al. | .................. 283/83 |
| 7,396,049 B2 | * | 7/2008 | Nelson et al. | .................. 283/83 |
| 7,494,945 B2 | * | 2/2009 | Moreshead | .................. 442/185 |
| 7,592,276 B2 | * | 9/2009 | Hill et al. | ..................... 442/301 |
| 2004/0226601 A1 | * | 11/2004 | Banister | ..................... 136/252 |
| 2006/0130894 A1 | * | 6/2006 | Gui et al. | ..................... 136/263 |
| 2007/0290217 A1 | * | 12/2007 | Daniels | ........................ 257/88 |
| 2008/0109941 A1 | * | 5/2008 | Moreshead | .................. 2/243.1 |

* cited by examiner

*Primary Examiner*—Thuy Vinh Tran
(74) *Attorney, Agent, or Firm*—Weingarten, Schurgin, Gagnebin & Lebovici LLP

(57) ABSTRACT

A portable lighting system is disclosed. The portable lighting system includes at least one light-emitting source, a power-generating source, a power storage device, and a processing system for controlling and managing power-generated by the power-generating source that are all are integrated into a flexible-layered structure. The flexible-layered structure is a layered structure of woven or non-woven, natural or made-made fibers that have been joined using sewing, sonic-welding or heat lamination manufacturing techniques. Materials for the flexible-layered structure include woven textiles, non-woven materials, flexible plastics, natural leather materials, artificial leather materials, reflective flexible materials, opaque flexible materials, translucent flexible materials, light-diffusing materials, and specular reflective materials.

13 Claims, 5 Drawing Sheets

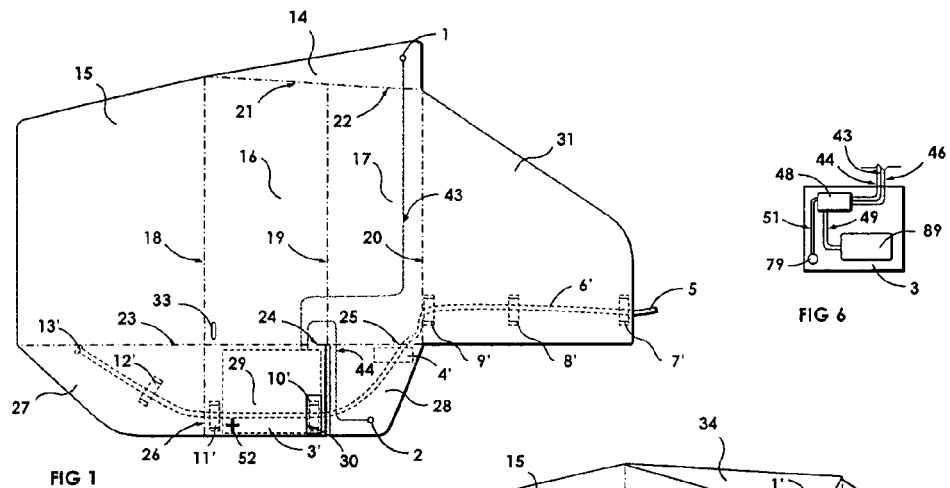
FIG 1
FIG 6
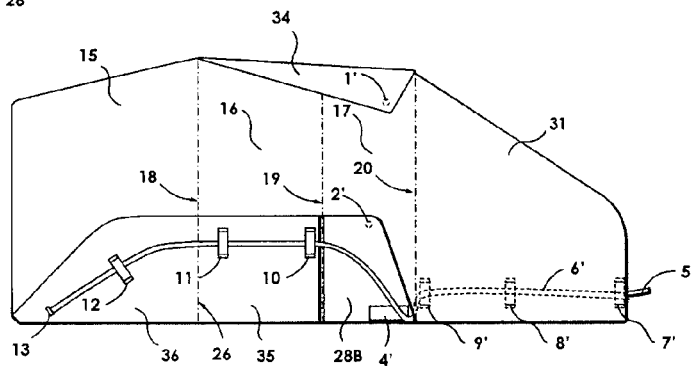
FIG 2
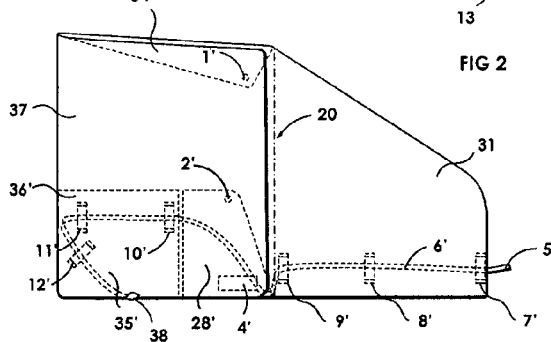
FIG 3
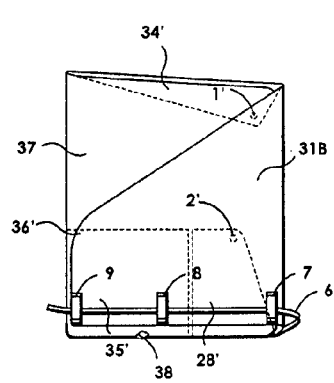
FIG 4
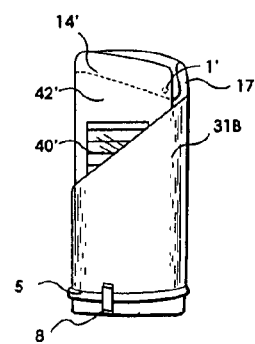
FIG 5

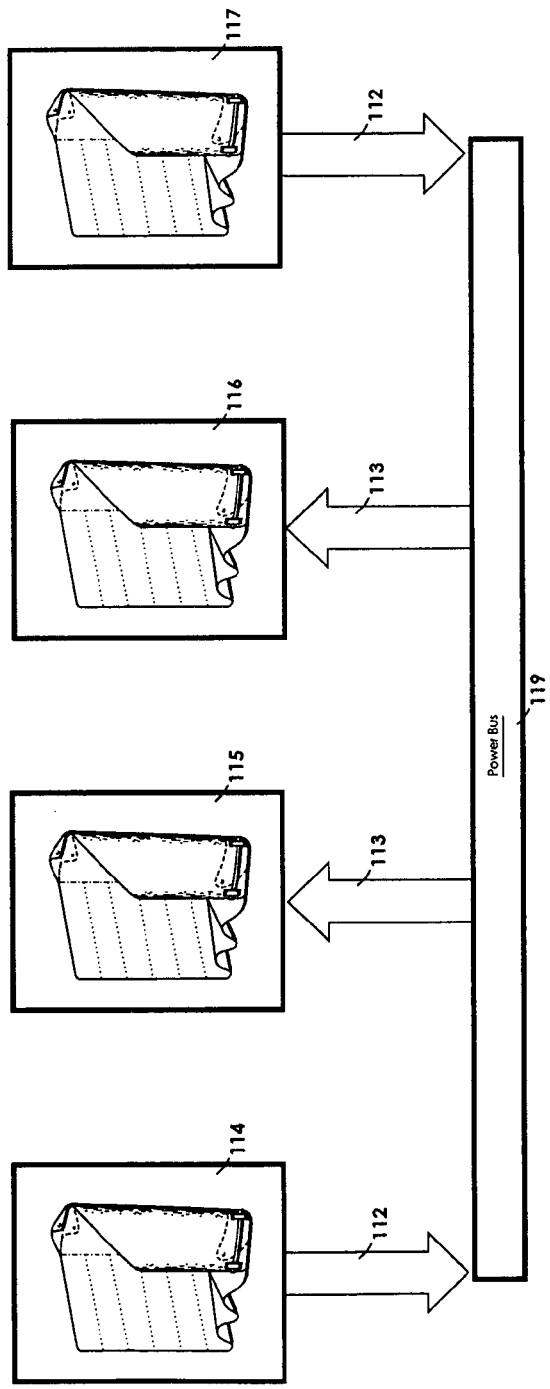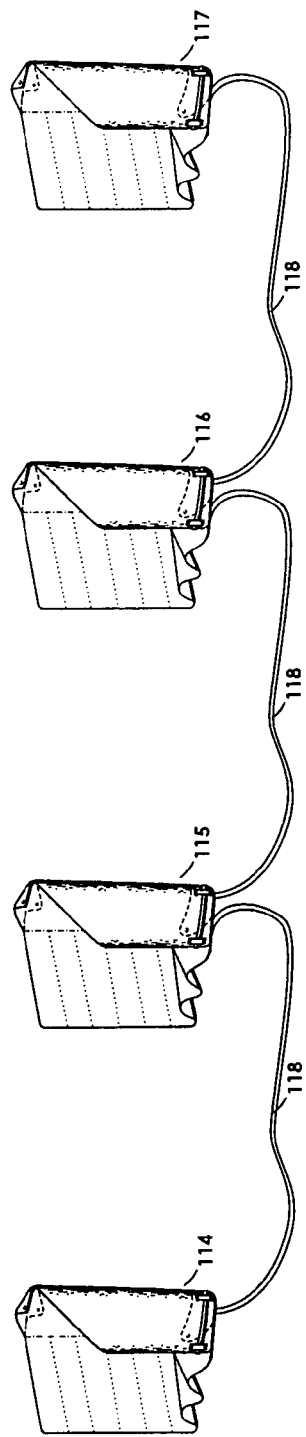

PORTABLE LIGHTING AND POWER-GENERATING SYSTEM

CROSS REFERENCE TO RELATED APPLICATIONS

This application claims the benefit of U.S. provisional patent application No. 60/847,484 filed on Sep. 27, 2006, which is incorporated herein in its entirety by reference.

STATEMENT REGARDING FEDERALLY SPONSORED RESEARCH OR DEVELOPMENT

Not Applicable

TECHNICAL FIELD

The field of the invention is related to portable lighting systems and, more particularly, to portable lighting systems having integrated power-generating means that are integrated into a flexible-layered structure.

BACKGROUND OF THE INVENTION

Conventional solar power systems that rely on silicon-based photovoltaic cells or panels typically contain components that are heavy, fragile, and—due to weight—costly to transport overland. Furthermore, large solar power systems, which require a high-capacity, rechargeable battery, can affect and complicate transport by air, due to time delays and expense associated with Federal Aviation Administration regulations concerning the transport of rechargeable batteries across international boundaries.

To address the weight issues, flexible, multi-purpose, solar power chargers have been developed. However, conventional solar power chargers often require numerous ancillary attachments for sourcing power to different devices or loads. These attachments can be quite bulky, heavy, and breakable and can add to the complexity and cost of the system. Moreover, flexible, solar power chargers have no fixed application, which is to say that the power they generate cannot be optimized for illumination or other purposes, and their physical form is rigid and cannot be adjusted in response to specific lighting needs.

Portable, solar-powered, re-chargeable flashlights and lanterns have a relatively compact, fixed volume. However, they also include numerous breakable parts that can fail or be damaged in transport and/or during rugged use. Like solar power chargers, the physical form and light output of portable, solar-powered, re-chargeable flashlights and lanterns cannot be modified or adjusted in response to specific lighting needs.

One problem associated with these products, however, stems from their design as singular, non-related devices, which does not offer the user the benefit or advantages of functionality associated with a distributed system where units may be used individually and in digitally-linked networks of multiple units.

Indeed, as the existing paradigm of centralized distribution—and its corollary, the singular object appliance—becomes less sustainable, the benefits of using long-term, renewable solutions for power and lighting distribution becomes increasingly important. A new paradigm is required to provide the flexibility of performance that can be achieved in distributed systems of power generation and lighting.

SUMMARY OF THE INVENTION

A versatile, flexible and configurable, distributed, portable lighting and power-generating system is disclosed. The system includes a power management and control system, which, along with the power-generating system, is integrated into a flexible-layered structure that is capable of providing form and optical enhancements to the portable lighting system while also protecting the same.

According to the present invention, small, compact, flexible photovoltaic cells or panels are used for generating DC power. The flexible photovoltaic cells or panels are integrated into the flexible-layered structure, to provide additional, planar structural support for specific, desirable lighting system configurations.

A small, compact power management and control system is also integrated into the flexible-layered structure, to optimize energy harvesting and light output performance of individual lighting systems and further to enable lighting systems to be grouped or bundled together via wired linkages and digital protocols for additional desirable functional benefits. Additional efficiencies, for example, in charging multiple units and in light level management between units are achieved through the design of a digital system of distributed intelligence.

The flexible-layered structure protects the photovoltaic cells or panels, the solid-state components, electrical wiring, and the power management and control system. The flexible-layered structure is made up of reflective, translucent, and/or opaque layers and is designed for rapid deployment and can be configured into a variety of optimally functional three-dimensional forms that provide light management benefits. As a result, the re-configurable forms can be used to reflect, focus, diffuse, and manage light output from the solid-state lighting source(s), which also are integrated in the flexible-layered structure.

BRIEF DESCRIPTION OF THE DRAWINGS

The invention will be more fully understood by reference to the following Detailed Description of the invention in conjunction with the Drawing, of which:

FIG. 1 shows a plan view of a portable lighting system in a flexible-layered structure in accordance with the present invention;

FIG. 2 shows a plan view of the portable lighting system of FIG. 1 with first, second and third inner flaps folded in accordance with the present invention;

FIG. 3 shows a plan view of the a portable lighting system of FIG. 2 with the fourth inner flap folded in accordance with the present invention;

FIG. 4 shows a plan view of the portable lighting system of FIG. 3 with the fifth flap folded in accordance with the present invention;

FIG. 5 shows a plan view of a completely-folded portable lighting system in accordance with the present invention;

FIG. 6 shows an illustrative schematic of the processing system for the power and control management system in accordance with the present invention;

FIG. 14 shows an illustrative diagram of current flow for group power-pooling applications in accordance with the present invention;

FIG. 15 shows an illustrative diagram of group power-pooling applications in accordance with the present invention;

DETAILED DESCRIPTION OF THE INVENTION

Figure 7:
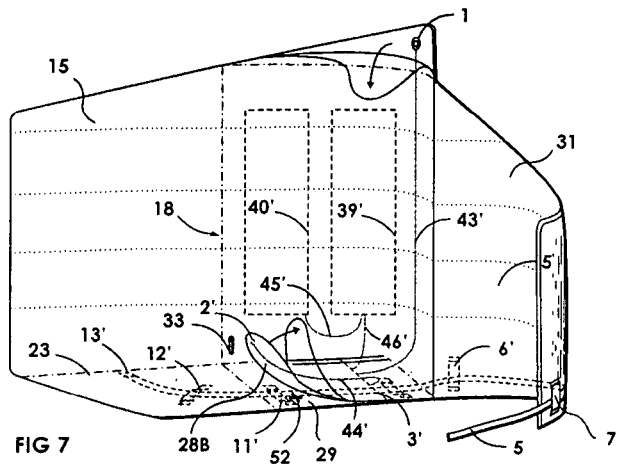
FIG. 7 shows an illustrative schematic of a first mode of operation of the portable lighting system in accordance with the present invention.

The disclosed portable lighting system integrates power generation, solid-state lighting, with a power management and control system in a robust, lightweight, self-contained, flexible-layered structure. The portable lighting system provides optical, structural, and functional benefits through its portability and adaptability to ambient, indirect, and direct lighting needs.

Flexible-Layered Structure

The structure of the portable lighting system is provided by a flexible-layered system. The flexible-layered system can be fabricated using sewing or "no sew" manufacturing methods, including, for example and without limitation, sonic-welding and heat lamination, to join, in a pre-defined master pattern, a plurality of flexible materials, each of which has or may have a different optical property, such as a white, translucent, light-diffusing material and a specular reflective material.

Because of the strength introduced into a textile by weaving, a flexible-layered structure of woven materials comprising either natural fibers or of man-made fibers or a flexible-layered structure comprising a combination of woven and non-woven fabric fibers is desirable. However, the flexible-layered structure can be practiced using non-woven fabrics, flexible plastics, natural or artificial leather materials, rubber materials or other flexible substrates, and the like. Optionally, the materials used for the flexible-layered structure can include integral hydrophobic, anti-microbial, and optical characteristics, which in some applications can be desirable for the system. The selected material for making the flexible-layered material can also be used in combination with reflective, opaque, and/or translucent textiles or non-woven layers.

Each layer of the flexible material is designed to unfold, e.g., along integral fold lines, into a flat of substantially flat master pattern. Flat patterns facilitate efficient industrial manufacture, cutting, and combination of layers by at least one of lamination, cutting and sewing, heat-lamination, sonic-welding, and/or by other manual or computerized industrial processes known to those of ordinary skill in the art.

For shipping and transport purposes, the flexible-layered structure is designed to fold into a compact, rectangular or substantially rectangular package. The flexible-layered structure is further designed to fold in such as way as to facilitate its attachment to and detachment from, for example, a carry bag, a back pack, a head dress, a scarf, a satchel, a briefcase, a saddle bag, and other like portable equipment or clothing.

The flexible-layered structure is further designed to expose photovoltaic cells or panels, which are physically integrated with or into the flexible-layered structure, to radiation, e.g., sunlight, while the flexible-layered structure is being transported while attached to any of the above-mentioned clothing and/or portable equipment. Advantageously, exposing photovoltaic cells or panels to radiation, charges a re-chargeable energy storage device also integrated into or with the system. Optionally, the flexible-layered structure can be purposely integrated into the design of a piece of portable equipment or clothing.

For example, referring to FIG. 1 through FIG. 5, an illustrative master pattern for the portable lighting system 32 is shown in various folding stages, ranging from unfolded (FIG. 1) to completely-folded (FIG. 5). Those skilled in the art can appreciate that the size and shape of the master pattern for the portable lighting system 32, the size and number of flaps and folds, and the relative locations of the flaps and folds can vary appreciably. Equally as variable is the material used and layered in connection with each flap.

The master pattern for the portable lighting system 32 includes a first flap 27, a second flap 28, a third flap 14, a fourth flap 15, a fifth flap 31, a left-center flap 16, a right-center flap 17, and a front controller board sleeve 29. For illustrative purposes only, the first flap 27, second flap 28, third flap 14, fourth flap 15, left-center flap 16, and right-center flap 17 are depicted (shaded) as having a reflective material showing while the fifth flap 31 and the front controller board sleeve 29 are depicted (no shading) as having a translucent and/or opaque material showing.

A top-left vertical fold 18 separates the fourth flap 15 from the left-center flap 16; a center vertical fold 19 separates the left-center flap 16 from the right-center flap 17; and a top-right vertical fold 20 separates the right-center flap 17 from the fifth flap 31. Top-left and top-right horizontal folds 21 and 22, respectively, separate the left-center 16 and right center flaps 17, respectively, from the third flap 14.

Bottom vertical fold 26 separates the first flap 27 from the front controller board sleeve 29. The front controller board sleeve 29 is not connected to the second flap 28. Bottom horizontal fold 23 separates the first flap 27 from the fourth flap 15. Bottom horizontal fold 24 separates the front controller board sleeve 29 from the left-center flap 16. Bottom horizontal fold 25 separates the second flap 28 from the right-center flap 17.

As shown in FIG. 2, the first 27 and second flaps 28 and the front controller board sleeve 29 can be folded along respective bottom horizontal folds 23, 24, and 25 so that the bottom vertical fold 26 is in registration with the top-left fold 18, exposing the outer portion 36 of the first flap 27, the rear controller board sleeve 35, and the outer portion 28B of the second flap 28. Similarly, the third flap 14 can be folded along the top-left and top-right horizontal folds 21 and 22, exposing the outer portion 34 of the third flap 14. For illustrative purposes only, the outer portion 36 of the first flap 27, the rear controller board sleeve 35, the outer portion 28B of the second flap 28, and the outer portion 34 of the third flap 14 are depicted as having a translucent or opaque material showing.

As shown in FIG. 3, the fourth flap 15 and the first flap 27 can then be folded along the top-left vertical fold 18 and the bottom vertical fold 26, exposing the outer portion 37 of the fourth flap 15. For illustrative purposes only, the outer portion 37 of the fourth flap 15 is depicted as having a translucent or opaque material showing. Then, as shown in FIG. 4, the fifth flap 31 can be folded along the top-right vertical fold 25, exposing the outer portion 31B of the fifth flap 31. For illustrative purposes only, the outer portion 31B of the fifth flap 31 is also depicted as having a translucent or opaque material showing.

Finally, as shown in FIG. 5, the whole can be folded along the center vertical fold 19, exposing the center outer flap 42 and at least one of the photovoltaic cells or panels 40 disposed thereon. For illustrative purposes only, the center outer flap 42 is depicted as having a translucent or opaque material showing. The free end 5 of a draw string 6 that is disposed through a plurality of drawstring loops 7-12 can then be pulled taut to tighten the whole.

The folded and flat or substantially flat features of the flexible-layered structure allow users to deploy the portable lighting system 32 rapidly by unfolding it from its transport position (FIG. 5) and re-folding it into a variety of three-dimensional forms, each form designed to accommodate different lighting tasks in a system of soft optics.

Due to the flexible-layered structure, the portable lighting system 32 can also be folded, overlapped upon itself, and/or rolled up by the user into a myriad of form geometries designed to propagate and distribute the solid-state lighting to accomplish different lighting tasks and needs. Advantageously, the various folded, overlapped, and rolled forms of the portable lighting system 32 function as a flexible, soft optical system that provides the user with reflective and diffusing surfaces to distribute, balance, and manage light output.

For example, referring to FIG. 7, the portable lighting system 32 is shown in one mode of operation in which the first flap 27 and the front controller board sleeve 29 are oriented orthogonally or substantially orthogonally to the fourth 15, left-center 16, and right-center flaps 17. Such an orientation is possible if the first flap 27 and the front controller board sleeve 29 are placed in the plane of a flat or substantially flat horizontal surface, such as a table, a floor or the ground, and the fourth 15, left-center 16, and right-center flaps 17 are perpendicular to the plane of the flat or substantially flat horizontal surface.

In FIG. 7, the right-center flap 17 is disposed about the center vertical fold 19 relative to the left-center flap 16 so that all or some portion of the second flap 28 is disposed over or on top of the front controller board panel 29. The fifth flap 31 is shown in an arcuate orientation.

Lighting sources or light-emitting devices 1 and 2, such as light-emitting diodes (LED), integrated into or integral with the positionable, second flap 28 and the third flap 14 can, for example, reflect light off of the surface of the fifth flap 31, for example to modify glare from a point source, to create backlighting, indirect lighting, direct lighting, and the like. Flexible wires or similar stiffeners (not shown) can be integrated, for example, into the flexible materials of the various flaps and/or folds of the portable lighting system 32 to enable users to vary the position of the individual lighting sources 1 and 2.

Figure 8:
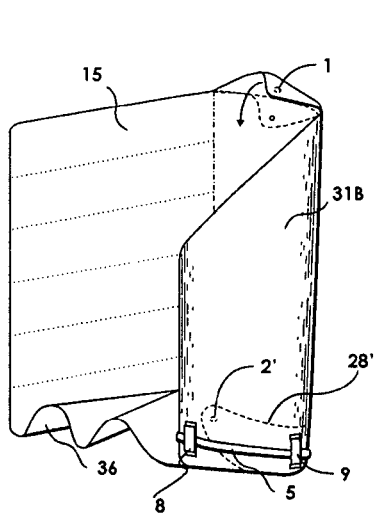
FIG. 8 shows an illustrative schematic of a second mode of operation of the portable lighting system in accordance with the present invention.

Referring to FIG. 1 and FIG. 8, an integrated tension system is shown. The integrated tension system includes a pull cord 6 that has a free, proximal end 5 and a fixed or anchored, distal end 13. The pull cord 6 can be routed through a plurality of loops 7-12 that are fixedly attached, e.g., sewn, heat-laminated, sonic-welded, and the like, to the rear controller board sleeve 35 and the outer portions 36, 28B, and 31B of the first 27, second 28, and fifth flaps 31B, respectively.

The integrated tension system enables users to draw the flexible-layered structure together, creating folds in the layered textile material, to stabilize the flexible-layered structure against the plane of a flat or substantially flat horizontal surface, such as a table, a floor or the ground. Using the pull cord 6 to draw the flexible-layered structure together also enables users to position an integral, light-diffusing layer of material across or over one or more lighting source 1 or 2, to mitigate the glare of the lighting sources 1 or 2, to create diffusing or/and ambient light conditions.

Figure 9:
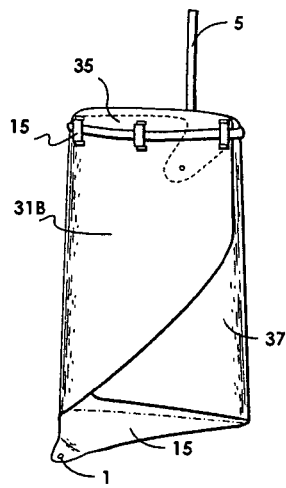
FIG. 9 shows an illustrative schematic of a third mode of operation of the portable lighting system in accordance with the present invention.

Optionally, one or more slits 33 through the flexible-layered structure can be included. As shown in FIG. 9, the draw cord 6 can be drawn through the slit(s) 33 to provide a cylindrical shape to the flexible-layered structure. The free end 5 of the pull cord 6 can the be attached to, e.g., a branch, a joist, a beam, a ceiling, and the like, to provide a hanging lighting source.

Figure 10:
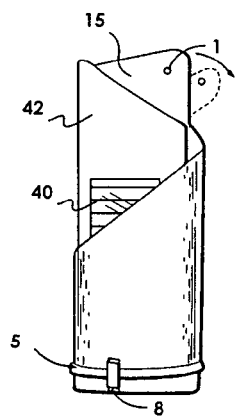
FIG. 10 shows an illustrative schematic of a fourth mode of operation of the portable lighting system in accordance with the present invention.

In another application, as shown in FIG. 10, after the system 32 has been completely folded, all or some portion of the third flap 14 can be pulled out to expose one of the lighting sources 1. The compact whole can be used in applications where a lantern or a flashlight would typically be used.

Inclusion of at least one hole in or opening through the flexible-layered structure (not shown), and further positioned with respect to the lighting sources 1 and 2, enables the user to reverse the directionality of each lighting source 1 and 2 by bending the lighting source 1 or 2 upon itself and directing its light through the hole or opening. For example, introduction of a grommet ring in the flexible-layered structure enables the user to reverse and/or re-direct the position and orientation of the lighting source(s) 1 or 2. As a result, the user can direct the light onto the reflective or translucent surface of some portion of the flexible-layered structure, whereby the light can be reflected and/or diffused without changing the selected folded form and configuration of the same.

In short, the flexible-layered structure provides a multiplicity of different configurations, suitable for direct, indirect, and/or ambient tasks. Users can select various combinations of optical reflectivity and/or diffusion as the reflective and diffusing layers of the flexible-layered structure are deployed singly and/or in combination with folded, overlapped, and/or rolled portions of the flexible-layered structure as well as the orientation of the integrated, solid-state lighting sources. For example, these orientations can include, by example and not limitation, table top-mounted direct and indirect task lighting, wall-mounted or hanging lighting systems, horizontal lighting surfaces, self-supporting lighting having soft, diffusing or reflecting light baffles of flexible material, and so forth.

Solid-State Light-Emitting Source

At least one solid-state light-emitting source 1 or 2 can be integrated into the flexible-layered structure to provide lighting. For example, high-brightness light-emitting diodes (LED) made by Philips Lumileds Lighting Company of San Jose, Calif. (LUXEON I) are suitable for use as light-emitting sources. Solid-state light-emitting sources 1 and 2 can also include light-emitting fibers that are woven into the flexible-layered material; flat or substantially flat organic LEDs that are woven into the flexible-layered material; light-emitting strips of electroluminescent film that are woven into the flexible-layered structure, and/or inorganic, flat or substantially flat solid-state lighting devices that are disposed between layers of the flexible-layered structure.

The solid-state light-emitting source(s) 1 and 2 can be positioned by the user via a flexible positioning structure and associated hardware, which can be integrated into the flexible-layered structure, e.g., via sewing or non-sewing manufacturing techniques. The integrated positioning mechanism for the solid-state light-emitting source 1 and 2 can include a flexible wire structure, a tensile cord system, a lightweight, plastic mechanism with articulated joint(s), or similar structures that allow the user to manipulate the orientation of the solid-state light-emitting source(s) 1 and 2 within the flexible-layered structure.

As previously mentioned, introduction of a grommet ring in the flexible-layered structure enables the user to reverse and/or re-direct the position and orientation of the solid-state light-emitting source(s) 1 and 2. As a result, the user can direct the light onto the surface of some portion of the flexible-layered structure, whereby the light can be reflected and/or diffused by the flexible-layered structure without changing the selected folded form and configuration of the same.

For example, when inorganic LEDs are used, the LEDs can be structured and arranged so that they are releasably connectable to, e.g., snap into, a fastening device that has been laminated onto the outer surface of the textile fabric. The fastening feature facilitates rapid upgrade and/or replacement when required. The fastening device, which is laminated onto the outer surface of the textile fabric, can be designed to align the LED 1 and 2 with a hole or opening that is purposely disposed in and through the flexible-layered structure, to receive the protective LED lens. Preferably, wire leads 43 and 46 leading to and from inorganic LED sources 1 and 2 can be integrated, e.g., using a seam in the fabric, using a laminated, flat wire housing, and the like.

For heat removal, the inorganic LEDs 1 and 2 can be mechanically fastened to a heat-dissipating device (not shown) such as a heat sink. Each heat sink is structured and arranged to be releasably attachable to its respective LEDs 1 and 2. The heat sink can include a flexible, woven, coiled wire fabricated from a highly thermally-conductive material, e.g., copper, aluminum, carbon fiber, carbon-metal composite, metal, metal alloy, and the like. The woven, coiled wire provides flexibility and dissipates heat from the LEDs 1 and 2.

Although the invention has been described for generic light-emitting devices, one specific application envisioned with the present invention includes application of a light-emitting device that emits light in the ultraviolet (UV) spectrum, for purposes of purifying water, sterilizing medical equipment, and the like. Another envisioned application includes using light-emitting devices that emit light in the infra-red or the red spectrum, for purposes of facilitating and accelerating the healing of wounds.

Photovoltaic Cells or Panels and Power Storage Device

The power source for the portable lighting system 32 must provide renewable power to drive the solid-state, light-emitting sources that are integrated into or with the flexible-layered structure and related control and power management systems under all conditions. Photovoltaic cells or panels such as conventional, flexible, amorphous silicon photovoltaic cells or panels, copper indium gallium diselenide (CIGS)-based photovoltaic cells, dye-based organic photovoltaic cells, and the like, provide non-exhaustible power by converting the sun's radiation into electrical power. For example, seven-cell/½-cell CIGS-based photovoltaic cells or panels such as those manufactured by Global Solar Energy, Inc. of Tucson, Ariz. (Model # 2500-1) are suitable for use in the present invention.

Figure 11:
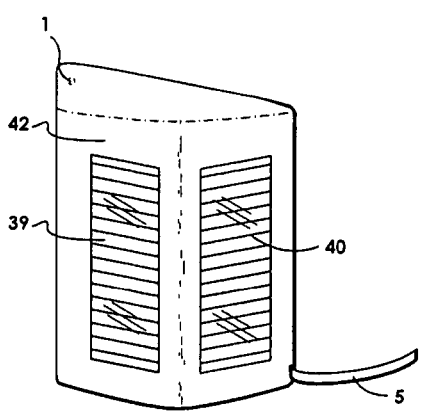
FIG. 11 shows an illustrative schematic of the photovoltaic cells or panels in accordance with the present invention.
Figure 12:
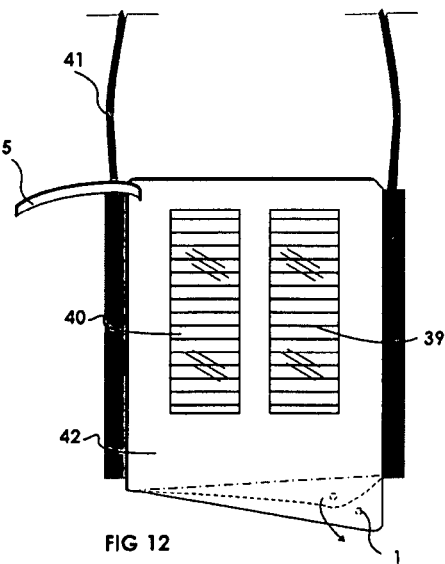
FIG. 12 shows an illustrative schematic of the photovoltaic cells or panels disposed on a back pack bag in accordance with the present invention.

Referring to FIG. 11 and FIG. 12, active, flexible photovoltaic cells or panels can be divided into multi-panel portions 39 and 40. The multi-panel portions 39 and 40 can be laminated onto or sewn into the flexible-layered structure, e.g., the center flap 42, and electrically coupled to a common electrical bus 44 within the flexible-layered structure. For example, the photovoltaic cells or panels 39 and 40 can be laminated into a single, flexible, flat or substantially flat plane so that the cells or panels 39 and 40 can be integrated into a multiplicity of portable electronic equipment.

Integration of the multi-panel portions 39 and 40 into the flexible-layered structure should further enable and not hinder folding, to minimize surface area during transport. Moreover, the multi-panel portions 39 and 40 should be able to be manipulated with respect to each other and arranged to provide, e.g., a more-rigid, 90-degree structure, for supporting an upright portion of the less-rigid flexible-layered structure such as shown in FIG. 7 and FIG. 8.

During periods of no or limited sunlight, for example, due to meteorological disturbances, photovoltaic cells or panels cannot produce electricity and are of limited value. Accordingly, an auxiliary, power storage device, such as a rechargeable battery, is desirable to drive the solid-state, light-emitting devices and other solid-state devices. The power storage device, e.g., rechargeable battery, can be coupled to the photovoltaic cells or panels so that when the photovoltaic cells or panels are not generating energy to drive any of the solid-state devices or other loads, the energy generated can be stored in the rechargeable battery for later use.

More particularly, the rechargeable battery can have a thin form, such as a lithium polymer or lithium ion battery, which can be integrated into or between flexible layers. For example, rechargeable lithium ion, thin-form batteries in the 4.2V to 1.8 Ah capacity range, such as Model #UBBPO-1 manufactured by Ultralite Batteries, Inc. of Newark, N.Y., are suitable for this use.

Power generated by the photovoltaic cells or panels can be provided to the electrical bus associated with the flexible-layered structure, to the rechargeable battery or to both the electrical bus and the rechargeable battery. To simplify the design and cost of the flexible-layered structure, however, power generated by the photovoltaic cells or panels can be fed just to the rechargeable battery. Consequently, power to the flexible-layered structure is always delivered from the rechargeable battery.

Although the primary power source and auxiliary power storage device of the invention have been described in connection with applications internal to the flexible-layered structure, external functionalities for the power sources can include generating electrical power to drive sensors, digital electronics, radios, digital communications systems, medical equipment, and other loads. When plural flexible-layered structures are combined, the combined photovoltaic cells or panels and/or rechargeable batteries can be used, for example, to recharge batteries for cellular phones, recharge batteries for personal (laptop) computers, and other, relatively-larger, 12- to 24-watt applications, and, in medical applications, to recharge batteries for hearing aids and to drive medical field equipment, such as digital thermometers, pulse oximeters, small medicine refrigeration systems, and the like.

Control and Power Management System

Referring to FIG. 1 and FIG. 6, the control and power management system 3 will be described. The control and power management system 3 includes digital electronics and microcontrollers that are adapted to optimize the performance of the solid-state light-emitting sources 1 and 2 and other devices and actuators integrated into the flexible-layered system. The control and power management system 3 is structured and arranged to be disposable and transportable in a thin, lightweight case (not shown), e.g., made of corrugated plastic, laminated in at least two plys for strength. The case (not shown) is dimensioned to be insertable in, for example, a pocket or sleeve 29 (FIG. 1) that is disposed between outer and inner flaps or layers of the flexible-layered structure. At least one mechanical fastener 30, e.g., a snap, a button, Velcro®, an interlocking slide fastener, and the like, can be provided in connection with the pocket or sleeve 29 for closure and rapid rechargeable battery access.

The control and power management system 3 includes a processing system 48 and a rechargeable battery 89. The processing system 48 can include a microprocessor 80, printed circuit board or the like. The processing system 48 also includes software and/or electronic hardware for controlling the output, e.g., intensity, of the light-emitting sources 1 and 2, for modulating the pulse width of the duty cycles of the light-emitting sources 1 and 2, and for charging the rechargeable battery 89. An internal electrical bus 49 electrically couples the processing system 48 to the rechargeable battery 89. An external electrical bus 44 electrically couples the processing system 48 and battery 89 to the light-emitting sources 1 and 2, e.g., via to wiring 43 and 46, respectively.

Figure 13:
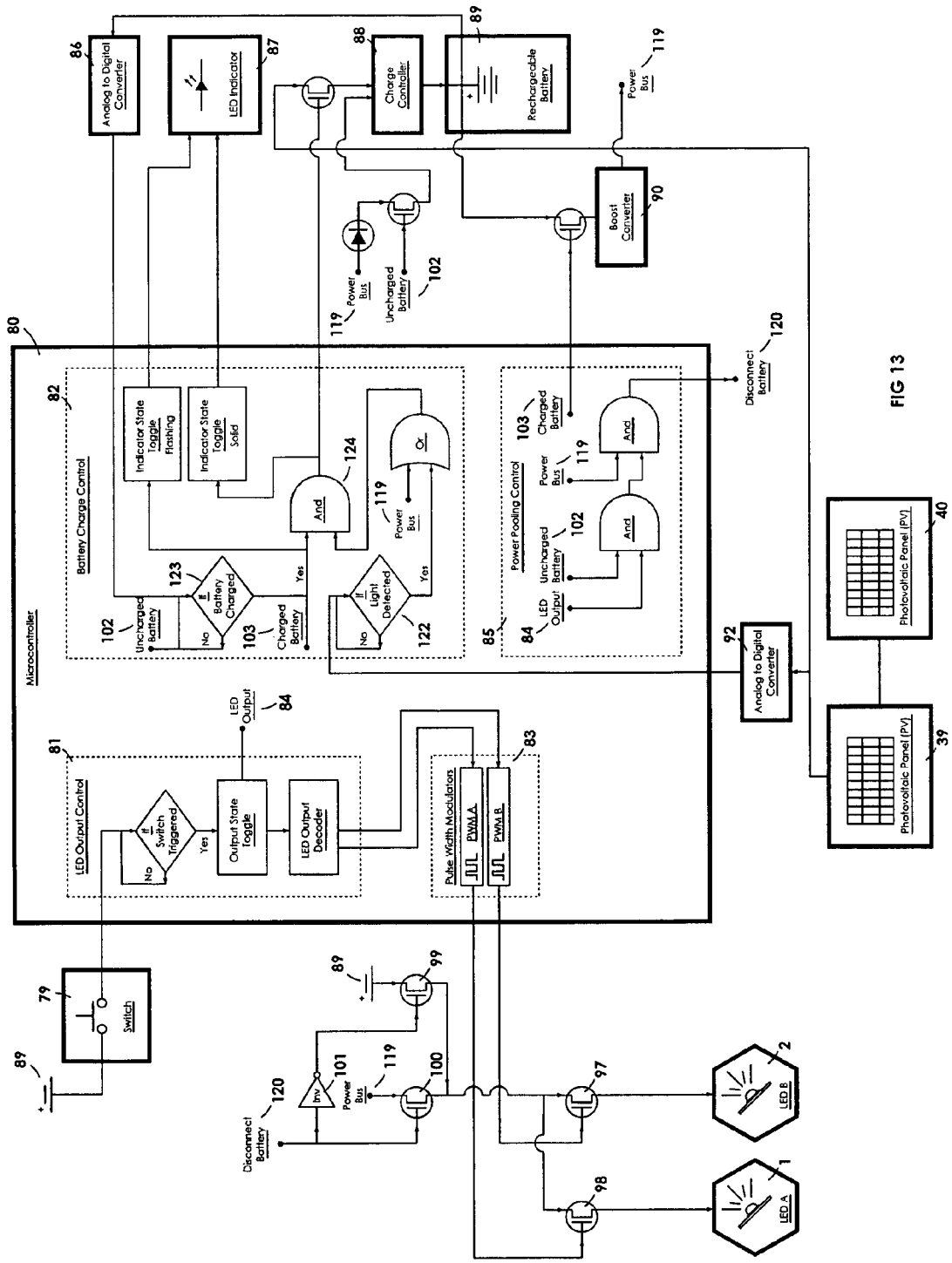
FIG. 13 shows an illustrative diagram of the power control and management system in accordance with the present invention.

Referring to FIG. 6 and FIG. 13, the control and power management system 3 is actuated by a switch, such as a flexible, tactile, membrane switch 79, or other electronic actuation device for turning ON and OFF the control and power management system 3. The flexible membrane switch 79 is integrated into the top surface of the laminated case of the control and power management system 3. The flexible switch 79 is electrically coupled to the processing system 48 via wire leads 51.

A highlighted or easily recognizable user interface, i.e., a push point 52, for the membrane switch 79 can be provided in the top layer of the flexible-layered structure, e.g., using an integral weave marking system. The location of the push point 52 is arranged so that the push point 52 aligns or is in registration with the membrane switch 79 when the control and power management system 3 is inserted in the front controller board sleeve 29 provided in the flexible-layered structure.

When the switch 79 is ON, electrical power generated by the photovoltaic cells or panels 39 and 40 is provided to the light-emitting sources 1 and 2. When the switch 79 is OFF, electrical power generated by the photovoltaic cells or panels 39 and 40 is used to recharge the rechargeable battery 89. Those of ordinary skill in the art can appreciate that it may be desirable to control the distribution of the power generated by the photovoltaic cells or panels 39 and 40 and delivered to the light-emitting sources 1 and 2 using pulse width modulation for which pulse width modulators 83 are provided in the control and power management system 3. Those of ordinary skill in the art can also appreciate the need for filters, circuits, switching devices, and other electronic devices 97 and 98 to affect and optimize the delivery of power to the light-emitting source 1 and 2.

The control and power management system 3 further includes a battery indicator 87, e.g., a multi-color LED, that is used in conjunction with the battery charging function 82 of the processing system 48. The battery indicator 87 can also be disposed near the top layer of the laminated case so as to be visible to provide a visual signal as to whether or not the battery 89 is charging or whether or not the photovoltaic cells or panels 39 and 40 are capable of charging the battery 89.

By example, the logic circuitry for the battery charge function 82 can include a sensing device that is coupled to the photovoltaic cells or panels 39 and 40 (the "PV sensing device 122") and a sensing device that is coupled to the battery 89 (the "battery sensing device 123"). The sensing devices 122 and 123 sample, for example, the voltage levels associated with the photovoltaic cells or panels 39 and 40 and the battery 89, respectively. Based on the results of the sampling, power generated by the photovoltaic cells or panels 39 and 40 is or is not delivered to the battery 89.

If there is insufficient sunlight to power the photovoltaic cells or panels 39 and 40, then there is no power being generated and the PV sensing device 122 outputs a voltage LO signal (logic 0) to an AND logic circuit 124. However, if there is sufficient sunlight and the photovoltaic cells or panels 39 and 40 are generating power, then the PV sensing device 122 will provide a voltage HI signal (logic 1) to the AND logic circuit 124.

In the illustrative battery charge controller 82 shown in the microprocessor 80 in FIG. 13, an OR logic circuit is shown between the outputs of the PV sensing device 122 and the power bus 119 on an input side and the AND logic circuit 124 on an output side, to allow battery charging via power-pooling even when there is no sunlight.

With respect to the battery sensing device 123, if a system's battery 89 is partially- or completely-discharged, a first solid-state device 102 coupled to the battery sensing device 123 will output a voltage HI signal (logic 1) to the control gate or the base of the charge controller 88 and to the power-pooling controller 85, while a second solid-state device 103 coupled to the battery sensing device 123 will output a voltage LO signal (logic 0) to the AND logic circuit 124 and to the power-pooling controller 85. The voltage HI signal from the first solid-state device 102 at the control gate or base will activate, drive high, and/or close the control gate or base, thereby coupling the charge controller 88 to the power bus 119. The voltage LO signal from the second solid-state device 103 will cause the battery indicator 87 to flash or blink, indicating that the battery 89 is low and in need of recharging.

Optionally, the battery sensing device 123 can be adapted to sense plural voltage thresholds that can be used to provide battery indicator 87 signals of different intensity and/or of different color as a function of the level of charge in the battery 89.

When the battery sensing device 123 detects that the battery 89 is fully- or adequately charged, the first solid-state device 102 outputs a voltage LO signal (logic 0) to the control gate or the base of the charge controller 88 and to the power-pooling controller 85 and the second solid-state device 103 outputs a voltage HI signal (logic 1) to the AND logic circuit 124 and to the power-pooling controller 85. The voltage LO signal from the first solid-state device 102 at the control gate or base will de-activate, drive low, and/or open the control gate or base, thereby de-coupling the charge controller 88 from the power bus 119. The voltage HI signal from the second solid-state device 103 will cause the battery indicator 87 to stop flashing, indicating that the battery 89 can be recharged, and will activate, drive high, and/or close the control gate or base, thereby coupling the boost converter 90 to the power bus 119.

More specifically, the AND logic circuit 124 outputs a voltage HI (logic 1) to a second control gate or base of the charge controller 88. The voltage HI signal from the AND logic circuit 124 will activate, drive high, and/or close the control gate or base, thereby coupling the charge controller 88 to the photovoltaic cells or panels 39 and 40. When the battery 89 is fully-charged, the battery indicator 87 turns off and the charge controller 88 uncouples the battery 89 from the photovoltaic cells or panels 39 and 40.

The sensing devices 122 and 123 shown in FIG. 13 are digital-type devices. Those of ordinary skill in the art can appreciate that analog sensing devices could also be used. However, because the sensing devices 122 and 123 are digital analog-to-digital converters 92 and 86 are needed.

When the rechargeable battery 89 and the photovoltaic cells or panels 39 and 40 are each able to deliver power to the portable lighting system 32, a switching device is needed. An illustrative switching device is shown in FIG. 13. The switching device includes a pair of solid-state switches 99 and 100, which for illustrative purposes only are shown as MOSFETs. One of the solid-state switching devices 99 is electrically coupled to the battery 89 and the other state switching devices 100 is electrically coupled to the power bus 119. A solid-state device 120 outputs a voltage HI (logic 1) signal, which activates, drives high, and/or closes the gate or base to solid-state switching device 100 and de-activates, drives low, and/or opens the gate or base to solid-state switching device 99, when the battery 89 is to be de-coupled from the light sources 1 and 2 and outputs a voltage LO (logic 0) signal, which activates, drives high, and/or closes the gate or base to solid-state switching device 99 and de-activates, drives low, and/or opens the gate or base to solid-state switching device 100, when the battery 89 is to be coupled to the light sources 1 and 2.

Figure 16:
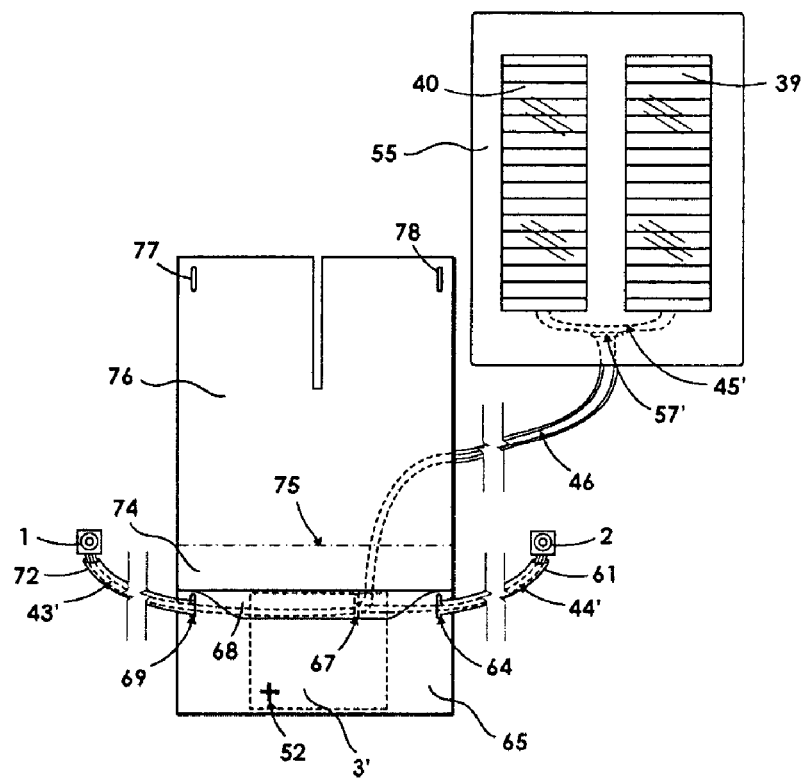
FIG. 16 shows an illustrative diagram of a portable lighting and power-generating system flex-kit in accordance with the present invention.
Figure 17:
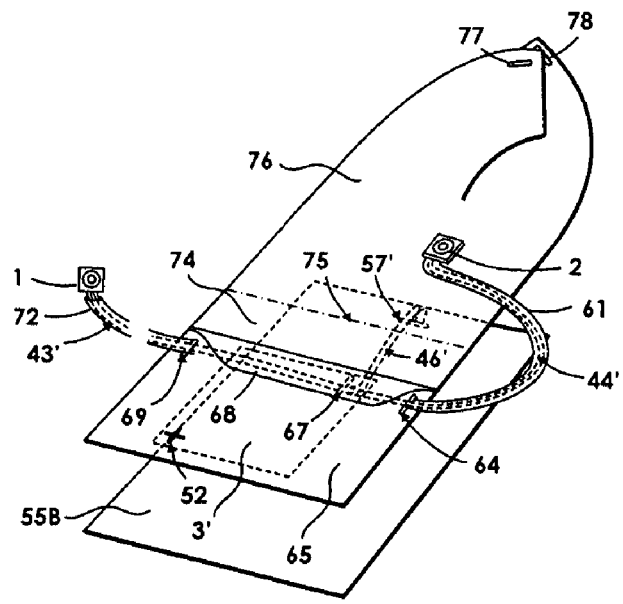
FIG. 17 shows the illustrative diagram of a portable lighting and power-generating system flex-kit of FIG. 16 with flaps folded to form a parabolic reflector in accordance with the present invention.

Having described a portable lighting system embodied in a master pattern 32, a more flexible embodiment ("flex-kit") to facilitate integration of the system into clothing, bags, and other portable equipment will now be described. Referring to FIG. 16 and FIG. 17, the flex-kit comprises a flexible-layered structure and an attachable and detachable photovoltaic cell or panel sleeve 55. The flexible-layered structure includes a first inner flap 76, a second inner flap 74, and a control and power management system sleeve 65. For illustrative purposes only, the first and second inner flaps 76 and 74 are depicted as having a reflective material showing and the control and power management system sleeve 65 is depicted as having a translucent or opaque material showing.

The first inner flap 76 can include two portions that are separate by a gap about which the two portions can be folded or overlapped. The first inner flap 76 is separated from the second inner flap 74 by the central fold 75. A closing flap 68 separates the second inner flap 74 from the control and power management system sleeve 65. Clasp holes 77 and 78 can be provided in the two portions, for example, to attach the two portions together to form a parabolic reflector (FIG. 17).

The photovoltaic cell or panel sleeve 55 is structured and arranged for accommodating a plurality of photovoltaic cells or panels 53 and 54.

The flex-kit control and power management system 3 can be the same as the one previously described, but which is capable of sliding in and out of the control and power management system sleeve 65. The external power bus 44 of the control and power management system 3 is electrically coupled to the photovoltaic cells or panels 53 and 54, e.g., via wire leads 56-59, for harvesting energy and also to the solid-state, light-emitting source 1 and 2, e.g., via wire leads 62, 63, 70, and 71. Wiring holes 64, 67, and 69 can be provided in the flexible-layered structure for the purpose of routing wire leads 56-59, 62, 63, 70, and 71. Optionally, wire leads 62 and 63 can be enclosed or encased in a wire sleeve 61 and wire leads 70 and 71 can be enclosed or encased in a wire sleeve 72. Stiffeners (not shown) can also be included in the wire sleeves 61 and 72, to enable users to orient the lights sources 1 and 2 as desired.

Applications

Having described a portable lighting system and power-generating system therefor that can be integrated into a flexible-layered structure, various applications of the system will now be described to show some of its myriad uses.

As a portable lighting system, the flexible-layered structure can be folded for ease of transport and unfolded for use in an area where electricity may be absent or frequently interrupted. Portions of the flexible-layered structure can be folded, rolled, overlapped, and/or fastened together by the user. Fastening methods include Velcro®, snaps, tie downs, buttons, and other mechanical attachments. The weight, relative-stiffness, and flat-form of the control and power management system and/or the photovoltaic cells or panels can be used as structural planes to provide rigidity to the device, e.g., the control and power management system can be used as a shear plane, in such as way as to bring the photovoltaic cells or panels from a substantially flat orientation to a more perpendicular orientation where they can modulate and direct light output.

The portable lighting systems can be used individually or can be coupled together and used collectively in groups. In a group arrangement, system and internal device redundancy, which is a disadvantage of fixed-building, integrated or "centralized" power and lighting systems, is greatly reduced due to the grouped systems' portability and their ability to be configured to support direct, indirect, and ambient lighting.

Referring to FIG. 14 and FIG. 15, individual portable lighting systems 114, 115, 116, and 117 can be electrically and operationally coupled for group use. In a group use or "power-pooling mode" of operation, a plurality of portable lighting systems 114, 115, 116, and 117 can be electrically coupled, which advantageously allows each of the coupled systems 114, 115, 116, and 117 to charge (or be charged) more efficiently and more uniformly than would be the case if they were charged individually. Systems 114, 115, 116, and 117 can be joined in a "daisy chain configuration", e.g., using a multi-conductor data/power bus 119 and 118, to facilitate transferring power from fully- or partially-charged systems to systems with under-charged or drained batteries 89.

Also embedded in the microcontroller 80 of each system 114, 115, 116, and 117 is software and/or hardware for performing a power-pooling function. Referring to FIG. 13, the power-pooling device or controller 85 of each system 114, 115, 116, and 117 samples the battery voltage of its own battery 89 via a power-pooling battery sensing device (not shown) or, alternatively, is adapted to process signals from the first and second solid-states devices 102 and 103 to couple or de-couple the battery 89 to the power bus 119 via a converter 90 for purposes of delivering charge to other batteries or receiving charge from other batteries.

For illustrative purposes only, the converter 90 shown in FIG. 13 is a boost converter. The converter 90 should be able to provide regulated voltage of about 6V so that the batteries 89, when fully charged, can reach about 4.2V.

For example, if the sensed battery voltage of a discrete system 114 is above a pre-selected and adjustable minimum power threshold, e.g., 50-percent charged, the power-pooling device or controller 85 corresponding to that system 114 couples its respective battery 89 to the power bus 119 via its boost converter 90, to share the "sharing" system's power above the minimum threshold with the batteries 89 of one or more of the other systems 115, 116, and/or 117. More particularly, when the battery sensing device 123 senses that the battery 89 is adequately charged, the first solid state device 102 outputs a voltage LO signal (logic 0) and the second solid state device 103 outputs a voltage HI signal (logic 1). As previously described, the voltage LO signal de-activates, drives low, and/or opens the gate or base to the charge controller 88, preventing power flow from the power bus 119 to the battery 89. The voltage HI signal activates, drives high, and/or closes the gate or base to the boost converter 90, allowing power flow from the battery 89 to the power bus 119.

If, on the other hand, the sensed battery voltage of a discrete system 115, 116, and/or 117 is below the pre-selected and adjustable minimum power threshold, e.g., 50-percent charged, the power-pooling device or controller 85 corresponding to that system 115, 116, and/or 117 couples its respective battery 89 to the power bus 119 via its charge controller 88, to receive power from the "sharing" system up to the minimum threshold. More particularly, when the battery sensing device 123 senses that the battery 89 is inadequately charged, the first solid state device 102 outputs a voltage HI signal (logic 1) and the second solid state device 103 outputs a voltage LO signal (logic 0). As previously described, the voltage LO signal de-activates, drives low, and/or opens the gate or base to the boost converter 90, preventing power flow from the battery 89 to the power bus 119. The voltage HI signal activates, drives high, and/or closes the gate or base to the charge controller 88, allowing power flow from the power bus 119 to the battery 89.

Once the sensed voltage of the "sharing" system 114 is drawn down to a stored voltage equal to the minimum power threshold and/or the other systems 115, 116, and/or 117 no longer need additional power, the power-pooling device 85 of the "sharing" system 114 automatically signals the charge controller 88, and boost converter 90 to isolate its respective battery 89 from the power bus 119 altogether.

Optionally, power-pooling between systems 114, 115, 116, and 117 can be adapted to cease if an external device, such as a cellular telephone, a laptop computer, and the like, were coupled to one of the systems in the connected chain. For example, if an external device is coupled to one of the systems among the chained systems, the power-pooling device or controller 85 of that particular system or the power-pooling devices or controller 85 of all of the system will no longer deliver or receive power via the power bus 119. Instead, the particular system will deliver power to the interrupting, external load.

Alternatively, power-pooling may also be initiated via a "time sharing" method in which a discrete system receives power from one or more "sending" systems 114 for a pre-established and adjustable period of time. As a result, the "receiving" system is charged by one or more of the "sending" systems in the group of connected systems. The power transfer continues for pre-established and adjustable period of time, which, generally, but not exclusively, is measurable in seconds. Optionally, "receiving" system status can rotate from system to system, to top off and optimize each system.

Grouped, portable lighting systems can also be combined to produce more evenly distributed illumination through dynamic power sharing between systems. "Power sharing" allows a group of users or a single user, such as a doctor, to deploy and couple a plurality of grouped systems, which can generate equal light levels for consistent illumination. Indeed, when plural systems are coupled in a group, via the data/power bus 118 and 119 and the switch or switches 79 are turned ON, each system in turn communicates its battery power level to the power-pooling device 85 of every other system in the group.

These data are used by each of the processors 80 or, optionally, by one of the processors 80 that has been adapted to be a master processor, to determine an optimal light level for all loads given the available, collective group power. Systems that are unable to meet this optimal light level individually, e.g., due to low battery levels, will receive power from one or more of the more-fully charged systems via the power transfer method described above in connection with "power-pooling".

It will be apparent to those skilled in the art that modifications to and variations of the disclosed method and system are possible without departing from the inventive concepts disclosed herein, and therefore the invention should not be viewed as limited except to the full scope and spirit of the appended claims.

We claim:

1. A portable lighting system comprising:
   at least one light-emitting source;
   a power-generating source that is electrically coupled to each of the at least one light-emitting source;
   a power storage device that is electrically coupled to the power-generating source and to each of the at least one light-emitting source;
   a processing system for controlling and managing power generated by the power-generating source; and
   a flexible-layered structure into which each of the at least one light-emitting source, the power-generating source, the power storage device, and the processing system are integrated,
   wherein each layer of the flexible-layered structure is structured and arranged to unfold into a flat or substantially flat master pattern and to re-fold into a myriad of three-dimensional forms, to provide a system of soft optics.

2. The portable lighting system as recited in claim 1, wherein the at least one light-emitting source is selected from the group consisting of a high-brightness light-emitting diodes; light-emitting fibers that are woven into the flexible-layered material; flat or substantially flat organic light emitting diodes that are woven into the flexible-layered material; light-emitting strips of electroluminescent film that are woven into the flexible-layered structure; inorganic, flat or substantially flat solid-state lighting devices that are disposed between layers of the flexible-layered structure a light-emitting device that emits light in the infrared-to-red spectrum or a light-emitting device that emits light in the ultraviolet spectrum.

3. The portable lighting system as recited in claim 1, wherein the power-generating source includes at least one photovoltaic cell or panel selected from the group consisting of amorphous silicon photovoltaic cells or panels, copper indium gallium diselenide (CIGS)-based photovoltaic cells or dye-based organic photovoltaic cells.

4. The portable lighting system as recited in claim 1, wherein the power storage device is a rechargeable battery.

5. The portable lighting system as recited in claim 1, wherein the processing system is configured for delivering power generated by the power-generating source to the power storage device.

6. The portable lighting system as recited in claim 1, wherein the processing system is configured for performing pulse width modulation on power delivered to the at least one lighting source.

7. The portable lighting system as recited in claim 1, wherein the flexible-layered structure is a layered textile structure of woven or non-woven, natural or man-made fibers that have been joined using sewing, sonic-welding or heat lamination manufacturing techniques.

8. The portable lighting system as recited in claim 7, wherein the woven or non-woven, natural or man-made fibers are materials selected from the group consisting of flexible plastic sheets, natural leather materials, artificial leather materials, reflective textile materials, opaque textile materials, translucent textile materials, light-diffusing materials, and specular reflective materials.

9. The portable lighting system as recited in claim 1, wherein the flexible-layered structure includes a plurality of flaps and folding areas that can be folded, rolled, or overlapped.

10. A portable lighting system adapted for power-pooling to more evenly distribute or store power, the system comprising:
 a plurality of portable lighting units that are electrically coupled to each other via a data and electrical bus, each of which includes:
  at least one light-emitting source,
  a power-generating source that is electrically coupled to each of the at least one light-emitting source,
  a power storage device that is electrically coupled to the power-generating source and to each of the at least one light-emitting source, and
  a processing system for controlling and managing power-generated by the power-generating source,
  wherein each of the at least one light-emitting source, the power-generating source, the power storage device, and the processing system are integrated into a flexible-layered structure;
 wherein the processing system of each of said portable lighting units is configured for electrically coupling its respective power storage device to the electrical bus through a sharing circuit when said power storage device has a sensed charge that exceeds a first threshold value and uncoupling its respective power storage device from the electrical bus when said power storage device has a sensed charge that equals the first threshold value, and that is configured for electrically coupling its respective power storage device to the electrical bus through a receiving circuit when said power storage device has a sensed charge that is less than a second threshold value and uncoupling its respective power storage device from the electrical bus when said power storage device has a sensed charge that exceeds the second threshold value.

11. A portable lighting system adapted for dynamic power sharing to more evenly distribute generated power, the system comprising:
 a plurality of portable lighting units that are electrically coupled to each other via a data and electrical bus, each of which includes:
  at least one light-emitting source,
  a power-generating source that is electrically coupled to each of the at least one light-emitting source,
  a power storage device that is electrically coupled to the power-generating source and to each of the at least one light-emitting source, and
  a processing system for controlling and managing power-generated by the power-generating source,
  wherein each of the at least one light-emitting source, the power-generating source, the power storage device, and the processing system are integrated into a flexible-layered structure; and
 a controller that is configured for generating equal levels of illumination to each of the at least one light-emitting sources of each of said plurality of portable lighting units.

12. A portable lighting system that is adapted to be electrically coupled via a data bus and an electrical bus to at least one other portable lighting system, each having at least one light-emitting source, the portable lighting system comprising:
 at least one light-emitting source;
 a power-generating source that is electrically coupled to each of the at least one light-emitting source;
 a power storage device that is electrically coupled to the power-generating source and to each of the at least one light-emitting source; and
 a processing system for controlling and managing power generated by the power-generating source,
 wherein each of the at least one light-emitting source, the power-generating source, the power storage device, and the processing system are integrated into a flexible-layered structure and
 wherein the processing system is configured to control and manage said power so that equal levels of illumination are output by each of the at least one light-emitting sources of the portable lighting system and at least one other portable lighting system when so coupled.

13. A portable lighting system that is adapted to be electrically coupled via a data bus and an electrical bus to at least one other portable lighting system, each having at least one light-emitting source, the portable lighting system comprising:
 at least one light-emitting source;
 a power-generating source that is electrically coupled to each of the at least one light-emitting source;
 a power storage device that is electrically coupled to the power-generating source and to each of the at least one light-emitting source; and
 a processing system for controlling and managing power generated by the power-generating source, the processing system being adapted to perform power pooling and power sharing,
 wherein each of the at least one light-emitting source, the power-generating source, the power storage device, and the processing system are integrated into a flexible-layered structure.

\* \* \* \* \*